US006544649B1

(12) United States Patent
Troughton

(10) Patent No.: US 6,544,649 B1
(45) Date of Patent: Apr. 8, 2003

(54) METHOD FOR MANUFACTURING AN IMPROVED HOG FUEL BOARD USING A CATALYST

(75) Inventor: Gary Ellis Troughton, Vancouver (CA)

(73) Assignee: Forintek Canada Corporation, British Columbia (CA)

(*) Notice: Subject to any disclaimer, the term of this patent is extended or adjusted under 35 U.S.C. 154(b) by 0 days.

(21) Appl. No.: 09/881,301

(22) Filed: Jun. 13, 2001

(51) Int. Cl.$^7$ .................................................. B32B 9/04

(52) U.S. Cl. .................... 428/411.1; 428/215; 428/284; 428/455; 428/532; 428/533; 428/534; 428/535; 428/536; 428/537.1; 428/512; 428/527; 264/112; 264/115; 264/124

(58) Field of Search .............................. 428/411.1, 215, 428/455, 284, 532, 533, 534, 535, 536, 537.1, 512, 527; 264/112, 115, 124

(56) References Cited

U.S. PATENT DOCUMENTS

| | | | | | |
|---|---|---|---|---|---|
| 2,537,101 | A | | 1/1951 | Smith et al. | 260/109 |
| RE24,174 | E | | 7/1956 | Heritage | 442/322 |
| 2,757,114 | A | | 7/1956 | Roberts | 428/535 |
| 2,779,683 | A | | 1/1957 | Gill, Jr. | 106/164.5 |
| 2,976,164 | A | * | 3/1961 | Glab | 106/164.5 |
| 3,224,925 | A | | 12/1965 | Brandts et al. | 162/93 |
| 3,305,499 | A | | 2/1967 | Bevans | 524/14 |
| 3,887,415 | A | | 6/1975 | Elmendorf et al. | 156/154 |
| 3,900,334 | A | | 8/1975 | Brink | 106/165.01 |
| 5,017,319 | A | | 5/1991 | Shen | 264/124 |
| 5,021,122 | A | | 6/1991 | Desrochers et al. | 162/150 |
| 5,225,264 | A | | 7/1993 | Kato et al. | 428/137 |
| 5,234,747 | A | | 8/1993 | Walser et al. | 428/215 |
| 5,334,445 | A | | 8/1994 | Ruyter et al. | 428/292.4 |
| 5,725,818 | A | * | 3/1998 | Troughton | 264/112 |
| 6,120,914 | A | * | 9/2000 | Troughton | 428/537.1 |

FOREIGN PATENT DOCUMENTS

| | | |
|---|---|---|
| CA | 532991 | 11/1956 |
| GB | 2 028 841 | 3/1980 |

OTHER PUBLICATIONS

S. Chow, "Bark Boards Without Synthetic Resins", Forest Products Journal, vol. 25, No. 11, Nov. 1975, pp. 32–37.

S. Chow, "Bark Boards Without Synthetic Resins," Forest Products Journal, Nov. 1975, pp. 32 to 37, vol. 25, No. 11 (On Order).

* cited by examiner

*Primary Examiner*—Leszek Kiliman
(74) *Attorney, Agent, or Firm*—Christie, Parker & Hale, LLP

(57) ABSTRACT

A hog fuel board is made by placing a hog fuel mat including an ammonium chloride catalyst with flexible non-sticking layers on outside surfaces between screens in a preheated platen press and pressing the mat to preset stops and for a predetermined time and pressure to cause adhesives naturally present in the hog fuel to disperse throughout the board. The presence of ammonium chloride as a catalyst uniformly distributed through the hog fuel mat significantly lowers the temperature required at the heating press platens to form a board which also has improved properties. There is also described a hog fuel veneer board with a hog fuel mat sandwiched between veneer sheets and a lumber product with a hog fuel coating thereon. These additional products are both formed using the ammonium chloride catalyst to reduce press temperatures and create a product with improved properties, particularly, internal bond strength.

41 Claims, 1 Drawing Sheet

METHOD FOR MANUFACTURING AN IMPROVED HOG FUEL BOARD USING A CATALYST

TECHNICAL FIELD

The present invention relates to a composite wood board product and its method of manufacture. More specifically, the present invention relates to an improved method of manufacture and an improved product created using a hog fuel mat with a catalyst. The method and resulting product rely on adhesives naturally present in the hog fuel that are dispersed throughout the board product during formation.

BACKGROUND OF THE INVENTION

Hog fuel is generally sawmill refuse that has been fed through a disintegrator or hog by which the various sizes and forms are reduced to a practically uniform size of chips or shreds. Hog fuels generally contain approximately 70% to 95% bark with the residue being primarily wood.

Bark boards made without synthetic resins are known. In an Article entitled "Bark Boards Without Synthetic Resins" published by S. Chow in Volume 25, No. 11, of the Forest Products Journal, pages 32 to 37, dated November, 1975, is disclosed making bark boards without the addition of synthetic resin by forming bark pieces into a mat and then compressing the mat in a platen press at a predetermined pressure and temperature. During the pressing step a vacuum is applied continuously to the platens to withdraw steam and water vapour. The boards were tested for dry bending strength and compared with particle board. Favourable results were obtained, however, the product has never achieved success in the marketplace.

Commonly owned U.S. Pat. No. 5,725,818 entitled MANUFACTURE OF A HOG FUEL BOARD and U.S. Pat. No. 6,120,914 entitled HOG FUEL BOARD, the disclosures of which are incorporated herein by reference, disclose a method of manufacturing a hog-fuel board and a hog fuel board product, respectively. The above patents are based on the idea that using hog fuel rather than carefully selected bark results in at least a small percentage of wood being automatically included with the bark, and a percentage of wood over 5% adds additional strength to a bark board product. Inasmuch as hog fuel already has wood particles therein, it is not necessary to separate the wood particles from the bark. Hog fuel is ideal as it comes from the hogging process that involves removal of bark from raw logs. Furthermore, the above patents disclose that it is possible to produce a hog fuel board without having to apply a vacuum to a platen press as required by Chow. The vacuum step is an expensive operation which may well have prevented the bark boards disclosed by Chow from being commercially feasible. The manufacturing process disclosed does require modification of existing platen press equipment to operate at a higher platen temperature.

After further development work, it has been discovered that the addition of a catalyst, ammonium chloride, in relatively small amounts to the hog fuel results in a board having improved strength that can be formed at lower platen temperatures. It is important that the catalyst be added uniformly throughout the hog fuel. This development only increases the commercial feasibility of the hog fuel board product.

DISCLOSURE OF INVENTION

The hog fuel board of the present invention is manufactured in platen press equipment operating at platen temperatures that are generally 10° C. to 40° C. lower (in the range between 230° C. to 290° C.) than in applicant's previous manufacturing method. The internal bond strength of the boards manufactured using the ammonium chloride catalyst is also significantly increased such that the boards have a strength greater than particle board without requiring the use of added adhesives. Boards made of hog fuel have greater strength in bending than boards made of bark alone. Furthermore, hog fuel boards have excellent dimensional stability for all uses as compared to other wood composite board products.

In one embodiment, the present invention provides a hog fuel veneer board comprising: a compressed hog fuel mat containing about 80% bark by weight and about 3% ammonium chloride by weight, the remainder being primarily wood residues sandwiched between veneer sheets, the board having adhesives naturally present in the hog fuel to maintain board cohesion, the adhesives dispersed throughout the mat from heat and pressure applied to form the board. The veneer sheets provide smooth woodgrain exterior surfaces suitable for furniture and many other uses.

The present invention also provides a method of forming a hog fuel board comprising the steps of: forming a hog fuel mat containing between about 70% and 95% bark by weight and between about 1% to 7% ammonium chloride by weight uniformly distributed through the hog fuel mat, the remainder being primarily wood residues, with flexible non-sticking layers on outside surfaces, between screens in a preheated platen press and pressing the mat in the platen press to preset stops for a predetermined time and at a predetermined pressure to cause adhesives naturally present in the hog fuel to disperse throughout the board.

In another embodiment, a lumber product has a hog fuel coating thereon comprising:

a compressed hog fuel mat coating containing about 80% bark by weight and about 3% ammonium chloride by weight, the remainder being primarily wood residues, the mat coating held together and held to the lumber product by adhesives naturally present in the hog fuel, to maintain cohesion in the mat and to the lumber product, the adhesives dispersed throughout the mat from heat and pressure applied to apply the coating to the lumber product. The finished product has the natural protection that bark gives to a tree, and provides improved chemical resistance, fire resistance and decay resistance over standard untreated lumber products.

BRIEF DESCRIPTION OF DRAWINGS

Aspects of the present invention are illustrated merely by way of example in the accompanying drawings in which.

MODES FOR CARRYING OUT THE INVENTION

The preparation of hog fuel products according to the present invention involves drying hog fuel, which is approximately 70% to 95% bark by weight, the remainder being wood residues, to about 3% to 5% moisture content. The hog fuel is then ground in a Wiley mill or suitable grinder to pass a 5 mesh screen. Thus, the hog fuel has approximately 4 mm size particles. A catalyst in the form of ammonium chloride ($NH_4Cl$) is added to the hog fuel such that the mixture is about 1% to 7% ammonium chloride by weight. The preferred hog fuel consistency is about 80% bark and 3% ammonium chloride. It is also important that the ammonium chloride catalyst is added uniformly to the hog fuel mat. Preferably, this is achieved by dissolving the catalyst in a small volume of water and mixing the resulting solution thoroughly with the hog fuel. If the catalyst is not mixed uniformly throughout the hog fuel, there is a risk of explosive delamination of the board during the pressing stage. Non-uniform mixing of the catalyst will tend to result in areas with high concentrations of the catalyst. Since the catalyst causes rapid acceleration of the chemical reaction, large quantities of heat tend to be generated in the areas of high catalyst concentration. Such rapid heat release can result in rapid volatilisation of the bark and high pressures which in turn can lead to the above-described delaminating explosions.

Figure 1:
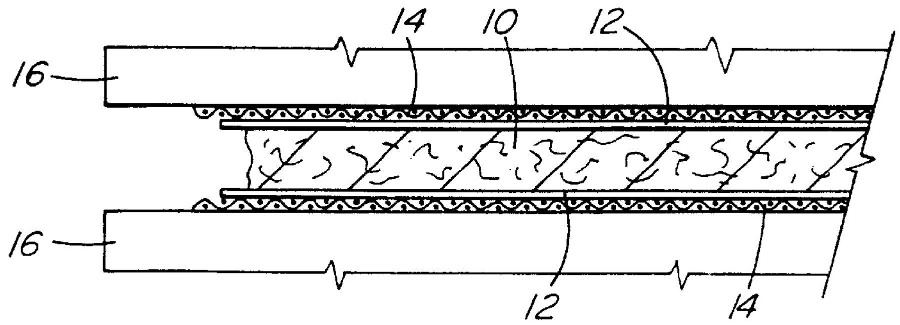
FIG. 1 is a sectional view showing a hog fuel board in a platen press.

FIG. 1 shows the manner in which hog fuel boards according to the present invention are manufactured. A hog fuel mat with ammonium chloride catalyst 10 is laid between two impermeable tetrafluoroethylene polymer sheets 12, generally known under the trademark TEFLON. These sheets represent flexible non-sticking layers to prevent the hog fuel sticking. This preform assembly is placed between interwoven stainless steel wire mesh screens 14 in a preheated platen press 16. The combination of the non-sticking layers 12 and the screens 14 permit the gases produced in the heating and pressing stage to expand against the screens 14 and produce small channels or grooves allowing the gases to escape. If solid platens are used without screens then the gases remain trapped in the board, and delamination occurs.

By virtue of the presence of the ammonium chloride catalyst, the platen press 16 needs to be preheated to a preset temperature in a range substantially lower by about 40° C. than the temperature range used for production of non-catalyzed hog fuel board. The preform assembly is compressed at a predetermined pressure to stops which determine board thickness. Pressure is maintained on the board in the press 16 for a preset time to permit the natural adhesives in the hog fuel to disperse throughout the mat 10 and act as an adhesive to hold the board together.

The resulting hog fuel board has excellent dimensional stability. The bark provides a natural protection against decay, improved chemical resistance over other wood products and better flame resistance properties.

In manufacturing hog fuel boards using the improved, catalyzed process of the present invention, hog fuel from Douglas fir, Hemlock or Western White Spruce wood was used to create test samples. Bark from other common wood species can also be used. The preferred hog fuel consistency is about 80% bark.

Table 1 shows properties data for 0.3 inch thick Douglas-fir hog fuel boards formed at platen press temperatures of 230° C. and 260° C. using 3% ammonium chloride catalyst. At each pressure temperature, the catalyzed hog fuel board preform assembly was compressed to stops with an initial pressure of 600 psi for one minute and then the pressure was reduced to 300 psi for four minutes. In contrast, Table 2 shows properties data for a control series of 0.3 inch thick Douglas-fir boards formed without catalyst according to the process of U.S. Pat. No. 5,725,818 at platen temperatures of 230° C., 260° C. and 300° C. In each case, the control hog fuel board preform assembly was subjected to the same pressure regime as the catalyzed board, namely, compression to stops at 600 psi for one minute and 300 psi for four minutes. It is apparent that the properties of the catalyzed board prepared at 260° C. are better than those of the non-catalyzed control board at 300° C. which was a preferred manufacturing temperature under the old process. The average internal bond (IB) strength of 106.6 psi for the catalyzed board at 260° C. is much higher than the 50.8 psi figure for the control board at 300° C. The modulus of elasticity (MOE) and modulus of rupture (MOR) figures for the catalyzed boards are improved when compared to the non-catalyzed boards made at the same temperature. In fact, the average internal bond strength of 68.4 psi for the catalyzed board made at 230° C. is higher than the 50.8 psi bond strength for the control board made at 300° C.

In other words, the catalyzed process of the present invention allows a lower platen temperature to be used during manufacture of the boards and results in a stronger board.

TABLE 1

| | Avg. Density (g/cm³) | | IB[a] | MOR (psi)[b] | | MOE (10⁵ psi)[c] | | 2-hour Boil[e] |
|---|---|---|---|---|---|---|---|---|
| | IB[a] | Bend[d] | (psi) | Dry | Boil | Dry | Boil | % Swelling |
| 0.3 inch thick Douglas-fir Hog Fuel Boards (230° C. @ 5 min 3% catalyst ($NH_4Cl$) | | | | | | | | |
| | 0.891 | 0.845 | 52.0 | 362.7 | 319.3 | 0.80 | 0.55 | 12.1 |
| | 0.864 | 0.821 | 35.3 | 468.2 | 150.8 | 0.93 | 1.33 | 7.6 |
| | 0.891 | 0.822 | 117.8 | 514.4 | 330.3 | 0.78 | 0.44 | 5.8 |
| Avg | 0.882 | 0.829 | 68.4 | 448.4 | 266.8 | 0.84 | 0.78 | 8.5 |
| 0.3 inch thick Douglas-fir Hog Fuel Boards (260° C. @ 5 min 3% Catalyst) | | | | | | | | |
| | 0.781 | 0.769 | 136.2 | 574.7 | 419.0 | 0.79 | 0.54 | 3.4 |
| | 0.812 | 0.807 | 127.5 | 804.3 | 486.8 | 1.04 | 0.70 | 3.7 |
| | 0.804 | 0.814 | 81.0 | 776.7 | 515.4 | 1.09 | 0.68 | 2.4 |
| | 0.812 | 0.805 | 130.4 | 752.6 | 425.4 | 1.03 | 0.54 | 2.0 |
| | 0.803 | 0.816 | 94.6 | 634.5 | 489.3 | 0.93 | 0.71 | 2.6 |
| | 0.808 | 0.802 | 91.0 | 911.3 | 513.6 | 1.07 | 0.68 | 4.0 |
| | 0.805 | 0.773 | 113.5 | 609.9 | 438.1 | 1.16 | 0.53 | 3.5 |
| | 0.779 | 0.782 | 79.0 | 679.5 | 382.4 | 1.07 | 0.54 | 4.1 |
| Avg | 0.801 | 0.796 | 106.6 | 717.9 | 458.7 | 1.02 | 0.62 | 3.2 |

Where
[a]IB represents internal bond
[b]MOR represents modulus of rupture
[c]MOE represents modulus of elasticity
[d]Bend represents bending sample
[e]% Thickness swelling after 2-hour boil test

TABLE 2

| | Avg. Density (g/cm³) | | IB[a] | MOR (psi)[b] | | MOE (10⁵ psi)[c] | | 2-hour Boil[e] |
|---|---|---|---|---|---|---|---|---|
| | IB[a] | Bend[d] | (psi) | Dry | Boil | Dry | Boil | % Swelling |
| 0.3 Inch thick Douglas-fir Hog Fuel Boards (230° C. @ 5 min No Catalyst | | | | | | | | |
| | 0.778 | 0.880 | 12.4 | 339.8 | 0 | 0.88 | 0 | delam |
| | 0.816 | 0.852 | 27.2 | 277.8 | 0 | 0.63 | 0 | delam |
| Avg | 0.797 | 0.866 | 19.8 | 308.8 | 0 | 0.75 | 0 | delam |
| 0.3 inch thick Douglas-fir Hog Fuel Boards (260° C. @ 5 min No Catalyst) | | | | | | | | |
| | 0.750 | 0.806 | 9.0 | 361.0 | 137.8 | 0.95 | 0.23 | 18.2 |
| 0.3 inch thick Douglas-fir Hog Fuel Boards (300° C. @ 5 min No Catalyst) | | | | | | | | |
| | 0.771 | 0.840 | 38.3 | 745.2 | 363.0 | 1.51 | 0.65 | 5.3 |
| | 0.857 | 0.739 | 63.1 | 497.2 | 421.0 | 0.97 | 0.79 | 3.7 |
| Avg | 0.814 | 0.790 | 50.8 | 621.0 | 392.0 | 1.24 | 0.72 | 4.5 |

Where
[a]IB represents internal bond
[b]MOR represents modulus of rupture
[c]MOE represents modulus of elasticity
[d]Bend represents bending sample
[e]% Thickness swelling after 2-hour boil test Table 3 shows the effect of catalyst concentration on the resulting board for a given platen press temperature of 260° C. As in previous examples, a pressure regime of 600 psi for one minute followed by 300 psi for four minutes was followed. Even a concentration in the hog fuel mixture of 1% ammonium chloride by weight has a significant effect on the properties of the hog fuel board. When compared to a board produced using no catalyst, internal bond strength (psi), modulus of rupture (psi), modulus of elasticity (psi), and percentage swelling are all improved in a board produced using the ammonium chloride catalyst at various concentrations. The optimum ammonium chloride concentration for a board manufactured using Douglas fir derived hog fuel is 3%.

TABLE 3

0.3 inch thick Douglas-fir Hog Fuel Boards (260° C. @ 5 min Different amounts of Catalyst)

| Catalyst | Avg. Density ($g/cm^3$) | | IB[a] | MOR (psi)[b] | | MOE ($10^5$ psi)[c] | | 2-hour Boil[e] % Swel- |
|---|---|---|---|---|---|---|---|---|
| (%) | IB[a] | Bend[d] | (psi) | Dry | Boil | Dry | Boil | ling |
| 0 | 0.750 | 0.806 | 9.0 | 361.0 | 137.8 | 0.947 | 0.23 | 18.2 |
| 1 | 0.814 | 0.780 | 69.8 | 384.3 | 345.1 | 1.0 | 0.63 | 4.8 |
| 2 | 0.821 | 0.790 | 61.9 | 418.1 | 347.7 | 0.88 | 0.56 | 4.4 |
| 3 | 0.801 | 0.796 | 106.6 | 717.9 | 458.7 | 1.0 | 0.62 | 3.2 |

Where
[a]IB represents internal bond
[b]MOR represents modulus of rupture
[c]MOE represents modulus of elasticity
[d]Bend represents bending sample
[e]% Thickness swelling after 2-hour boil test Table 4 shows properties data for hog fuel boards formed according to the catalyzed process of the present invention using Hemlock derived hog fuel at a platen press temperature of 230° C. and a pressure of 600 psi for one minute followed by a pressure of 300 psi for four minutes. The boards were manufactured using a catalyst concentration of 3% or 7%. The results indicate that there is little difference in board properties at the two different catalyst concentrations with all other process parameters being maintained.

TABLE 4

| Avg. Density ($g/cm^3$) | | IB[a] | MOR (psi)[b] | | MOE ($10^5$ psi)[c] | | 2-hour Boil[e] |
|---|---|---|---|---|---|---|---|
| IB[a] | Bend[d] | (psi) | Dry | Boil | Dry | Boil | % Swelling |
| | Hemlock Hog Fuel Boards (230° C. @ 5 min 3% Catalyst) | | | | | | |
| 0.806 | 0.739 | 27.9 | 323.6 | 254.3 | 0.95 | 0.62 | 8.3 |
| | Hemlock Hog Fuel Boards (230° C. @ 5 min 7% Catalyst) | | | | | | |
| 0.757 | 0.780 | 22.3 | 305.8 | 203.0 | 0.99 | 0.49 | 10.4 |

Where
[a]IB represents internal bond
[b]MOR represents modulus of rupture
[c]MOE represents modulus of elasticity
[d]Bend represents bending sample
[e]% Thickness swelling after 2-hour boil test Table 5 shows properties data for Hemlock hog fuel boards formed at platen press temperatures of 230° C., 260° C. and 290° C. using 3% ammonium chloride catalyst. At the press temperatures of 230° C. and 260° C., the preform assembly was pressed to stops at 600 psi for one minute and the pressure was then reduced to 300 psi for four minutes. At 290° C., the preform assembly was compressed to stops at an initial pressure of 600 psi for one minute and the pressure was then reduced to 300 psi for two minutes. In contrast, Table 6 shows properties data for a control series of Hemlock boards formed without catalyst at the same temperatures and using the same pressures and times as for the catalyzed hog fuel boards. As with the Douglas fir boards set out in Table 1 and 2, there is a significant improvement in all measured properties in the catalyzed Hemlock boards with all other process parameters being kept constant.

TABLE 5

| Avg. Density ($g/cm^3$) | | IB[a] | MOR (psi)[b] | | MOE ($10^5$ psi)[c] | | 2-hour Boil[e] % |
|---|---|---|---|---|---|---|---|
| IB[a] | Bend[d] | (psi) | Dry | Boil | Dry | Boil | Swelling |
| | Hemlock Hog Fuel Boards (230° C. @ 5 min 3% Catalyst) | | | | | | |
| 0.806 | 0.739 | 27.9 | 323.6 | 254.3 | 0.95 | 0.62 | 8.3 |
| | Hemlock Hog Fuel Boards (260° C. @ 5 min 3% Catalyst) | | | | | | |
| 0.825 | 0.827 | 107.2 | 1005.1 | 527.2 | 1.64 | 1.03 | 8.0 |
| | Hemlock Hog Fuel Boards (290° C. @ 3 min 3% Catalyst) | | | | | | |
| 0.775 | 0.806 | 119.1 | 774.3 | 656.7 | 1.5 | 1.01 | 8.6 |

Where
[a]IB represents internal bond
[b]MOR represents modulus of rupture
[c]MOE represents modulus of elasticity
[d]Bend represents bending sample
[e]% Thickness swelling after 2-hour boil test

TABLE 6

| | Avg. Density ($g/cm^3$) | | IB[a] | MOR (psi)[b] | | MOE ($10^5$ psi)[c] | | 2-hour Boil[e] |
|---|---|---|---|---|---|---|---|---|
| | IB[a] | Bend[d] | (psi) | Dry | Boil | Dry | Boil | % Swelling |
| | | Hemlock Hog Fuel Boards (230° C. @ 5 min No Catalyst) | | | | | | |
| | 0.729 | 0.681 | 13.7 | 134.2 | 0 | 0.41 | 0 | delam |
| | | Hemlock Hog Fuel Boards (260° C. @ 5 min No Catalyst) | | | | | | |
| | 0.793 | 0.718 | 36.9 | 140.0 | 111.2 | 0.41 | 0.28 | 15.3 |
| | 0.727 | 0.773 | 15.6 | 297.5 | 123.6 | 0.87 | 0.42 | 21.2 |
| Avg | 0.760 | 0.746 | 26.3 | 218.8 | 117.4 | 0.64 | 0.35 | 18.3 |
| | | Hemlock Hog Fuel Boards (290° C. @ 3 min No Catalyst) | | | | | | |
| | 0.715 | 0.860 | 25.4 | 386.4 | 226.8 | 1.22 | 0.34 | 18.3 |

Where
[a]IB represents internal bond
[b]MOR represents modulus of rupture
[c]MOE represents modulus of elasticity
[d]Bend represents bending sample
[e]% Thickness swelling after 2-hour boil test Table 7 shows the properties data for 0.375 inch thick hog fuel boards formed using White Spruce bark obtained from a sawmill hogger. The boards were formed at a platen press temperature of 230° C. using different amounts of ammonium chloride catalyst as well as no catalyst for a control. At the press temperatures of 230° C., the catalyzed hog fuel board preform assembly was compressed to stops with an initial pressure of 200 psi for two minutes and then the pressure was increased to 500 psi for two minutes, and then reduced to 300 psi for 11 minutes. The non-catalyzed hog fuel samples were pressed using the same schedule as the catalyzed boards according to the process of U.S. Pat. No. 5,725,818.

From reviewing Table 7, it is apparent that the properties of the catalyzed boards made with 0.5 and 1.0% catalyst by weight are better than those of the non-catalyzed boards. The average internal bond (IB) strength for the catalyzed boards increased with the amount of catalyst added going up to 55.7 psi at 1% catalyst by weight. This is significantly greater than the average IB strength of 14.3 psi for the control hog fuel board with no catalyst. Furthermore, the dimensional stability of the catalyzed hog fuel board (1.0% catalyst) is improved over the control. The catalyzed board using 1% catalyst experienced only 14.7% edge swelling versus 61.5% swelling for the non-catalyzed board after a two hour boil test. Water absorption after the 2 hour boil test was much lower at 41% for the 1% catalyzed board compared to 102% for the non-catalyzed board. The bending modulus of rupture strength (782 psi) and modulus of elasticity (244,000 psi) for the catalyzed hog fuel board were significantly higher than the corresponding values for the non-catalyzed control board (560 psi and 203,000 psi).

Impermeable tetrafluoroethylene polymer sheets 12 are placed on both sides of the veneer sheets 22 to prevent sticking in the press. This complete preform assembly is then placed between screens 14 in a preheated platen press 16. The preheated platen press 16 is heated to a selected temperature and the assembly is compressed to stops., representing a preset thickness of board, and maintained at a pressure to permit the natural adhesives within the hog fuel to disperse throughout the mat 10 and act as an adhesive to join the hog fuel particles to the veneer sheets 22.

In one embodiment, the Teflon sheets are 1/64" thick and are incised to ensure that any gas present within the mat can escape from the preform assembly and the screens permit gases to pass to the sides of the press.

No vacuum is required for the pressing step, thus expensive vacuum platen presses are not needed.

Figure 4:
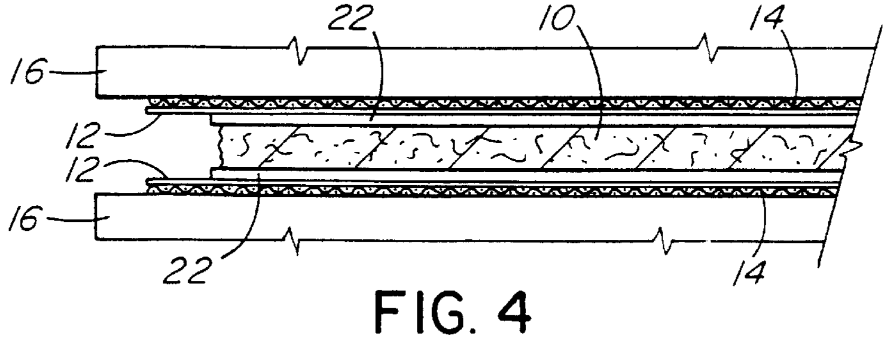
FIG. 4 is a sectional view showing a hog fuel veneer board in a platen press.

In a preferred embodiment, the preform assembly of the hog fuel veneer board illustrated in FIG. 4 is placed between screens and positioned in a preheated platen press at 230° C., the assembly is compressed to stops with an initial pressure of 600 psi for one minute and then the pressure is reduced to 300 psi for four minutes.

TABLE 7

Properties of Catalyzed and Non-Catalyzed Western White Spruce 0.375 inch Thick Hog Fuel Boards

| | | Avg. Density | | | Avg. Bending Modulus of Rupture | Avg. Bending Modulus of Elasticity | Average % | |
|---|---|---|---|---|---|---|---|---|
| Pressing Conditions | Catalyst Weight % (w/w) | IB (g/cc) | Bending Dry (g/cc) | Avg. Internal Bond (psi) | Dry Condition (psi) | Dry Condition ($10^5$ psi) | Swelling after 2-hour boil test (%) | % Water Absorption (%) |
| Pressed 15 min @ 230° C. 2 min at 200 psi. followed by 2 min at 500 psi, followed by 11 min at 300 psi | 0.5 | 0.85 | 0.93 | 28.5 | 625 | 1.87 | 37 | 83 |
| Pressed 15 min @ 230° C. 2 min at 200 psi, followed by 2 min at 500 psi, followed by 11 min at 300 psi | 1.0 | 0.92 | 0.90 | 55.7 | 782 | 2.44 | 14.7 | 41 |
| Pressed 15 min @ 230° C. 2 min at 200 psi, followed by 2 min at 500 psi, followed by 11 min at 300 psi | 0 (Non-catalyzed) | 0.85 | 0.92 | 14.3 | 560 | 2.03 | 61.5 | 102 |

Figure 2:
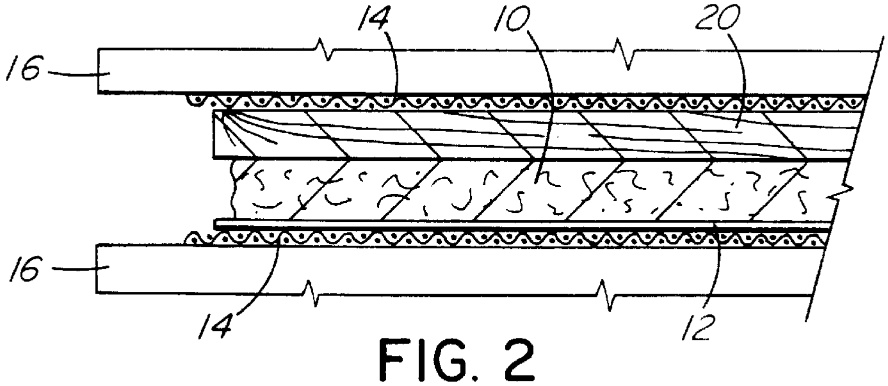
FIG. 2 is a sectional view showing a hog fuel coating on a lumber board in a platen press.
Figure 3:
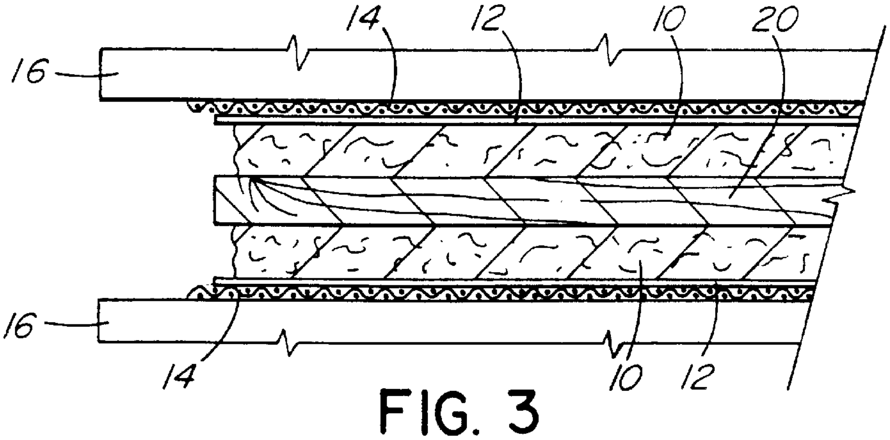
FIG. 3 is a sectional view showing a lumber product with hog fuel coatings on both sides.

In another embodiment, the method of the present invention is useful for creating a hog fuel coating on lumber. A hog fuel coating with ammonium chloride catalyst is applied to one or both sides of a lumber product such as a board. FIG. 2 shows a single side coating wherein a hog fuel mat 10 is placed on a non-sticking layer 12 and a lumber 20 is placed between the screen mesh 14 and the mat 10. In FIG. 3, two sides of the lumber 20 are coated, therefore hog fuel/catalyst mat 10 is placed on both sides. No additional adhesive is required and the natural adhesives in the hog fuel joins the hog fuel particles to the lumber 20. The assembly is then pressed to stops. Thus the density of the coating on the board is determined by the placing of the stops and the quantity of hog fuel used. The densified bark surface produced is typically 1/16".

In a still further embodiment, the method of the present application can be used to create a hog fuel veneer board. As shown in FIG. 4, a hog fuel/catalyst mat 10 is sandwiched between thin veneer sheets 22. The thickness of hog fuel is dependent upon the requirements of the veneer board and in some cases is ruled by the space available in the platen press.

In another embodiment the press is heated to 260° C., the preform assembly is compressed to stops with an initial pressure of 600 psi for one minute and then the pressure is reduced to 300 psi for 4 minutes.

In another embodiment, a non-sticking reagent is sprayed onto the outside veneer sheets to act as a flexible non-sticking layer in place of the Teflon sheets.

By way of example, a hog fuel veneer board was manufactured using a Douglas-fir hog fuel/catalyst mat (approximately 4 mm size particles) of about 80% bark and a catalyst concentration of 3%, the remainder being wood residues. The mat was placed in an open ended 12"×12" box, 5" deep between 1/16" thick non-incised birch veneer sheets, and then placed between thin Teflon sheets. For the laboratory trials, a box was used to contain the material. For commercial application, forming lines used to lay up the hog fuel/catalyst mat core and the outer veneer sheets will be utilized. The Teflon sheets were placed on a interwoven stainless steel wire mesh screen (2 mm thick). A slight pressure (about 10 psi) was exerted in the press while the box was removed. The Teflon sheet and the screen were then placed on top of the assembly and it was pressed to stops in a preheated press at 260° C. at a pressure of 600 psi for one minute which was subsequently reduced to 300 psi for four minutes. The resulting veneer board thickness was approximately 0.3 inches thick and having the bending characteristics set out in Table 8. The results of Table 8 indicate that by bonding thin birch veneers to the catalyzed Douglas-fir hog fuel in a one step process, the bending strength (MOR) and bending stiffness (MOE) of the resulting hog fuel veneer board is increased by a factor of 7 or 8 when compared to hog fuel board made under similar conditions.

TABLE 8

Bending Data for Catalyzed Douglas fir Hog-fuel Veneer Board *

| Veneer Overlay (0.02-inch) | Board Thickness (inches) | Density (g/cc) | Avg. ** MOR (psi) | Avg. ** MOE (psi) | Test Condition |
|---|---|---|---|---|---|
| Non-incised birch veneer | 0.3 | 0.89 | 5190 | 823,000 | Dry |

Where
* Boards pressed at 260° C. for 5 min
** Average of 2 bending samples

It was also found that the veneer board has a natural resistance to decay as the bark is the strongest and most protective portion of a tree, therefore all the protective properties of bark are applied to the wood product.

Hog fuel veneer boards can be formed using a hardwood veneer such as birch or a softwood veneer such as pine. A 1/32" permeable non-incised pine veneer is a preferred veneer. Other wood species can also be used.

The hog fuel boards, veneer boards and board coatings manufactured according to the present invention using ammonium chloride as a catalyst offer improved properties over products formed without the catalyst. Effectively, test data indicates that the use of the ammonium chloride catalyst at a concentration of about 3% by weight allows platen press temperature to be reduced by at least 40° C. to produce hog fuel boards that have substantially improved properties over non-catalyzed boards produced at higher temperatures. Therefore, the temperature reduction serves to improve the commercial feasibility of the catalyzed hog fuel boards.

In addition, the percentage thickness swell of catalyzed Douglas-fir hog fuel boards is shown in Tables 1 and 3 and for catalyzed Hemlock hog fuel boards is shown in Tables 4 and 5. It will be noted that after a two hour boil test, the catalyzed boards exhibited excellent dimensional stability properties that indicate they can be used in exposed or semi-exposed locations.

The tests for MOR, MOE, and internal board strength set out in Tables 1–8 were conducted according to OCSA 3-0188.1-M-78 standard (Interim mat formed wood particleboard).

The catalyzed end products (hog fuel board, hog fuel veneer board, or lumber product with a hog fuel coating) have internal bond strength properties that are improved over particle board and non-catalyzed board and the catalyzed end product continues to enjoy the same natural resistance to decay as the non-catalysed board. The bark present in the manufactured boards tends to be more resistant to chemicals than plain wood as it is a protective coating for the tree.

Various changes may be made to the embodiments shown herein without departing from the scope of the present invention which is limited only by the following claims.

I claim:

1. A method of forming a hog fuel board comprising the steps of:

forming a hog fuel mat containing between about 70% and 95% bark by weight and between about 1% to 7% ammonium chloride by weight uniformly distributed through the hog fuel mat, the remainder being primarily wood residues, with flexible non-sticking layers on outside surfaces, between screens in a preheated platen press and pressing the mat in the platen press to preset stops for a predetermined time and at a predetermined pressure to cause adhesives naturally present in the hog fuel to disperse throughout the board.

2. The method of forming a hog fuel board according to claim 1 wherein the hog fuel mat contains about 80% bark by weight.

3. The method of forming a hog fuel board as claimed in claim 1 wherein the hog fuel mat contains about 3% ammonium chloride by weight.

4. The method of forming a hog fuel board according to claim 1 wherein the hog fuel is dried to a moisture content in the range of about 3% to 5%.

5. The method of forming a hog fuel board according to claim 1 wherein the flexible non-sticking layer is a tetrafluoroethylene polymer sheet.

6. The method of forming a hog fuel board according to claim 4 wherein the tetrafluoroethylene polymer sheet is 1/64" thick and is incised.

7. The method of forming a hog fuel board according to claim 4 wherein the hog fuel is initially ground to pass through a 5 mesh screen, thus having approximately 4 mm size particles.

8. The method of forming a hog fuel board according to claim 1 wherein the ammonium chloride is uniformly distributed by dissolving in water and mixing the solution with the hog fuel mat.

9. A method of forming a hog fuel veneer board comprising the steps of:

placing a hog fuel mat containing between about 70% and 95% bark by weight and between about 1% and 7% ammonium chloride by weight uniformly distributed through the hog fuel mat, the remainder being primarily wood residues, between veneer sheets with flexible non-sticking layers on outside surfaces of the veneer sheets to form a preform assembly;

positioning the assembly between screens in a preheated platen press, and pressing the preform assembly in the platen press to preset stops for a predetermined time and at a predetermined pressure to cause adhesives naturally present in the hog fuel to disperse throughout the assembly.

10. The method of forming hog fuel veneer board according to claim 9 wherein the hog fuel mat contains about 80% bark.

11. The method of forming a hog fuel veneer board as claimed in claim 9 wherein the hog fuel mat contains about 3% ammonium chloride by weight.

12. The method of forming a hog fuel veneer board according to claim 9 wherein the hog fuel is dried to a moisture content in the range of about 3% to 5%.

13. The method of forming a hog fuel veneer board according to claim 9 wherein the veneer sheets are incised.

14. The method of forming a hog fuel veneer board according to claim 13 wherein the veneer sheets are 1/16" thick birch.

15. The method of forming a hog fuel veneer board according to claim 13 wherein the veneer sheets are 1/32" thick pine.

16. The method of forming a hog fuel veneer board according to claim 9 wherein the platen press is heated to a temperature in the range of about 230° C. to 290° C.

17. The method of forming a hog fuel veneer board according to claim 16 wherein the platen press is preheated to a temperature of about 230° C., and wherein the preform assembly is pressed at a pressure of about 600 psi for about one minute, followed by a pressure of 300 psi for about four minutes.

18. The method of forming a hog fuel veneer board according to claim 16 wherein the platen press is preheated to a temperature of about 290° C. and wherein the preform assembly is pressed at a pressure of about 600 psi for about one minute, followed by 300 psi for about two minutes.

19. The method of forming a hog fuel veneer board according to claim 9 wherein the flexible non-sticking layer is a tetrafluoroethylene polymer sheet.

20. The method of forming a hog fuel veneer board according to claim 19 wherein the tetrafluoroethylene polymer sheet is 1/64" thick and is incised.

21. The method of forming a hog fuel veneer board according to claim 9 wherein the hog fuel is initially ground to pass through a 5 mesh screen, thus having approximately 4 mm size particles.

22. The method of forming a hog fuel veneer board according to claim 9 wherein the ammonium chloride is uniformly distributed by dissolving in water and mixing the solution with the hog fuel mat.

23. A method of forming a hog fuel coating on a lumber product, comprising the steps of:

placing a hog fuel mat containing between about 70% and 95% bark by weight and between about 1% to 7% ammonium chloride by weight uniformly distributed through the hog fuel mat, the remainder being primarily wood residues, onto at least one surface of a lumber product with a flexible non-sticking layer on an outside surface of the hog fuel mat to form a preform assembly;

positioning the assembly in a preheated platen press with a screen between the non-sticking layer and the platen press, pressing the preform assembly in the platen press to preset stops for a predetermined time and at a predetermined pressure to cause adhesives naturally present in the hog fuel to disperse throughout the assembly.

24. The method of forming a hog fuel coating on a lumber product according to claim 23 wherein the hog fuel mat contains about 80% bark by weight.

25. The method of forming a hog fuel coating on a lumber product as claimed in claim 23 wherein the hog fuel mat contains about 3% ammonium chloride by weight.

26. The method of forming a hog fuel coating on a lumber product according to claim 23 wherein the hog fuel is dried to a moisture content in the range of about 3% to 5%.

27. The method of forming a hog fuel coating on a lumber product according to claim 26 including the steps of placing a hog fuel mat on both sides of the lumber product, with flexible non-sticking layers on outside surfaces of the mat, positioning the assembly between screens in the preheated platen press.

28. The method of forming a hog fuel coating on a lumber product according to claim 24 wherein the assembly is pressed to produce a densified hog fuel surface approximately 1/16" thick.

29. The method of forming a hog fuel coating on a lumber product according to claim 24 wherein the platen press is heated to a temperature in the range of about 230° C. to 290° C.

30. The method of forming a hog fuel coating on a lumber product according to claim 24 wherein the flexible non-sticking layer is a tetrafluoroethylene polymer sheet.

31. The method of forming a hog fuel coating on a lumber product according to claim 30 wherein the tetrafluoroethylene polymer sheet is 1/64" thick and is incised.

32. The method of forming a hog fuel coating on a lumber product according to claim 24 wherein the hog fuel is initially ground to pass through a 5 mesh screen, thus having approximately 4 mm size particles.

33. The method of forming a hog fuel coating on a lumber product according to claim 23 wherein the ammonium chloride is uniformly distributed by dissolving in water and mixing the solution with the hog fuel mat.

34. A hog fuel board comprising a compressed hog fuel mat, the mat containing between about 70% to 95% bark by weight and between about 1% and 7% ammonium chloride by weight, the remainder being primarily wood residues, the board having adhesives naturally present in the hog fuel to maintain board cohesion, the adhesives being dispersed throughout the mat from heat and pressure applied to form the board.

35. A hog fuel veneer board comprising: a compressed hog fuel mat containing about 80% bark by weight and about 3% ammonium chloride by weight, the remainder being primarily wood residues sandwiched between veneer sheets, the board having adhesives naturally present in the hog fuel to maintain board cohesion, the adhesives dispersed throughout the mat from heat and pressure applied to form the board.

36. The hog fuel veneer board according to claim 35 wherein the veneer sheets are incised.

37. The hog fuel veneer board according to claim 36 wherein the veneer sheets are birch having a thickness of 1/16".

38. The hog fuel veneer board according to claim 35 wherein the veneer sheets are pine having a thickness of 1/32".

39. A lumber product with a hog fuel coating thereon comprising:

a compressed hog fuel mat coating containing about 80% bark by weight and about 3% ammonium chloride by weight, the remainder being primarily wood residues, the mat coating held together and held to the lumber product by adhesives naturally present in the hog fuel, to maintain cohesion in the mat and to the lumber product, the adhesives dispersed throughout the mat from heat and pressure applied to apply the coating to the lumber product.

40. The lumber product according to claim 39 wherein hog fuel coating is on both sides of the lumber product.

41. The lumber product according to claim 39 wherein the hog fuel coating is approximately 1/16" thick.

* * * * *

UNITED STATES PATENT AND TRADEMARK OFFICE

CERTIFICATE OF CORRECTION

PATENT NO. : 6,544,649 B1
DATED : April 8, 2003
INVENTOR(S) : Gary Ellis Troughton It is certified that error appears in the above-identified patent and that said Letters Patent is hereby corrected as shown below:

Column 8,
Line 6, "stops.," should read -- stops, --

Column 9,
Line 53, "according to OCSA" should read -- according to CSA --

Signed and Sealed this

Twenty-third Day of September, 2003

JAMES E. ROGAN
*Director of the United States Patent and Trademark Office*